US011989605B2

(12) United States Patent
Forster

(10) Patent No.: US 11,989,605 B2
(45) Date of Patent: May 21, 2024

(54) RFID-INTEGRATED PACKAGES AND METHODS OF INTEGRATING RFID DEVICES INTO PACKING MATERIALS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/999,712

(22) PCT Filed: Jun. 2, 2021

(86) PCT No.: PCT/US2021/035357
§ 371 (c)(1),
(2) Date: Nov. 23, 2022

(87) PCT Pub. No.: WO2021/247644
PCT Pub. Date: Dec. 9, 2021

(65) Prior Publication Data
US 2023/0222308 A1    Jul. 13, 2023

Related U.S. Application Data

(60) Provisional application No. 63/034,101, filed on Jun. 3, 2020.

(51) Int. Cl.
*G06K 19/07* (2006.01)
*B65D 81/05* (2006.01)
(Continued)

(52) U.S. Cl.
CPC ......... *G06K 19/0723* (2013.01); *B65D 81/05* (2013.01); *G06K 19/07773* (2013.01);
(Continued)

(58) Field of Classification Search
CPC ......... G06K 19/0723; G06K 19/07794; B65D 81/05
(Continued)

(56) References Cited

U.S. PATENT DOCUMENTS

2002/0067267 A1   6/2002   Kirkham
2006/0080819 A1   4/2006   McAllister
(Continued)

FOREIGN PATENT DOCUMENTS

EP   2024910   2/2009
EP   3014532   5/2016
(Continued)

OTHER PUBLICATIONS

International Search Report and Written Opinion dated Oct. 11, 2021 issued in corresponding IA No. PCT/US2021/035357 filed Jun. 2, 2021.
(Continued)

*Primary Examiner* — Toan C Ly

(57) ABSTRACT

RFID-integrated packages are disclosed combining a container, an article positioned within the container, and a packing material positioned within the container between at least a portion of the article and an inner surface of the container. The packing material is manufactured by at least partially associating it with an RFID device. The packing material may be formed of a recyclable material, such as paper. The packing material together with the RFID device is processed to provide it with an impact-absorbing configuration. Processing methods may include folding, crushing, and cutting or slitting, with the RFID device continuing to perform well after it and the packing material have been processed into the impact-absorbing configuration for use within the container. The entire RFID device may be associated to the packing material or only a portion or compo-
(Continued)

nent of RFID device may be associated to the packing material, with another portion or component associated to the container or article.

18 Claims, 3 Drawing Sheets

(51) Int. Cl.
      *G06K 19/077*     (2006.01)
      *H01Q 1/22*       (2006.01)
      *H01Q 7/00*       (2006.01)
      *H01Q 9/16*       (2006.01)

(52) U.S. Cl.
      CPC ............. *H01Q 1/2208* (2013.01); *H01Q 7/00* (2013.01); *H01Q 9/16* (2013.01)

(58) Field of Classification Search
      USPC ........................................................ 235/492
      See application file for complete search history.

(56) References Cited

U.S. PATENT DOCUMENTS

2006/0232060 A1* 10/2006 Tucker ................ B42D 15/006
                                                                               283/101
2011/0012713 A1* 1/2011 Wilkinson ......... G06K 7/10297
                                                                               340/10.5
2012/0324834 A1   12/2012  Weder

FOREIGN PATENT DOCUMENTS

JP           2014-41410        3/2014
WO         2007/034518      3/2007

OTHER PUBLICATIONS

International Preliminary Report on Patentability dated Dec. 6, 2022 issued in corresponding IA No. PCT/US2021/035357 filed Jun. 2, 2021.

* cited by examiner

RFID-INTEGRATED PACKAGES AND METHODS OF INTEGRATING RFID DEVICES INTO PACKING MATERIALS

CROSS-REFERENCE TO RELATED APPLICATION(S)

The present application is a 371 of International Application No. PCT/US2021/035357, which was published in English on Dec. 9, 2021, and claims the benefit of U.S. Provisional Patent Application No. 63/034,101 filed Jun. 3, 2020, both of which are incorporated herein by reference in their entireties.

FIELD OF THE DISCLOSURE

The present subject matter relates to radio frequency identification ("RFID") devices. More particularly, the present subject matter relates to integrating RFID devices into packing material for shipping containers or receptacles.

BACKGROUND

Traditionally, polystyrene chips and air-filled bubble wrap has been used for packing items into a box for shipping. These materials, although effective, are typically based on plastic and can be difficult to recycle. For environmental reasons, a number of companies have replaced the use of these polystyrene chips and air-filled bubble wrap with folded and structured recycled paper. The paper is usually folded, crumpled, or slit to provide additional padding.

It been proven advantageous to attach an RFID tag or RFID label (collectively referred to herein as "RFID devices") on shipping containers for inventory and confirmation of delivery purposes. Typically, the RFID device is adhered, by adhesive or otherwise, to the outside of the container. While on the outside of the container, the RFID device may be subject to damage and may require a waterproof material for protection. This waterproof material can be plastic and difficult to recycle.

Accordingly, it would be desirable to associate an RFID device with a shipping container in a manner that avoids damage from the environment without the need for difficult-to-recycle plastic.

SUMMARY

There are several aspects of the present subject matter which may be embodied separately or together in the devices, systems, and methods described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an RFID-integrated package includes a receptacle, an article positioned within the receptacle, and a packing material. The packing material is positioned within the receptacle between at least a portion of the article and an inner surface of the receptacle. The packing material is an impact material. The RFID-integrated package includes the packing material and an RFID device at least partially associated to the packing material.

In another aspect, the RFID device of the RFID-integrated package comprises a reactive strap and an antenna. The antenna is independently associated to the packing material as compared to the reactive strap, while still being coupled to the reactive strap.

In yet another aspect, a method of integrating an RFID device into a package includes at least partially associating an RFID device to a packing material, processing the packing material together with the RFID device to provide an impact-absorbing configuration, and inserting the processed packing material into a receptacle between an inner surface of the receptacle and at least a portion of an article positioned within the receptacle.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF THE ILLUSTRATED EMBODIMENTS

Figure 1:
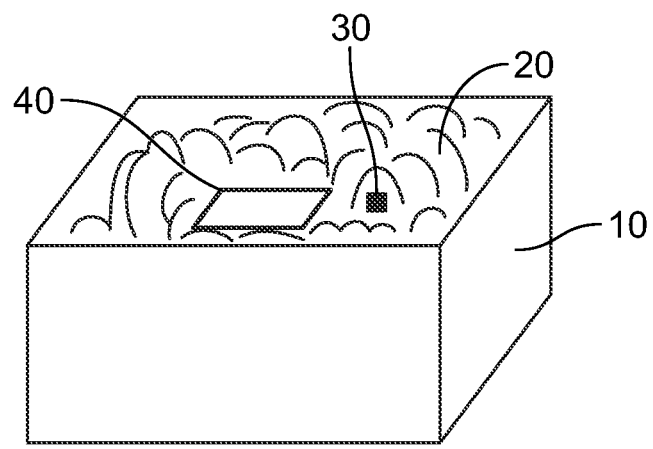
FIG. 1 is an illustrative representation of an exemplary RFID-integrated package of the current disclosure.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

An exemplary embodiment of an RFID-integrated package according to the present disclosure is illustrated in FIG.

1 and includes a container or box or carton or receptacle 10, a packing material 20, an RFID device 30 and an article 40. As is conventional, the article 40 is positioned within the receptacle 10, with the packing material 20 positioned between at least a portion of the article 40 and an inner surface of the receptacle 10 to absorb impacts experienced by the receptacle 10, thereby preventing damage to the article 40.

The packing material 20 may be variously configured without departing from the scope of the present disclosure, provided that it can be processed into an impact absorbing material having an impact-absorbing configuration. It may be advantageous for the packing material 20 to comprise a recyclable material, with the packing material 20 being paper in an exemplary embodiment. The manner in which the packing material 20 is processed to be formed into an impact-absorbing structure may vary depending on the nature of the packing material 20. In the case of a paper packing material, this can be done by folding, crumpling or crushing, slitting or cutting, or a combination of the aforementioned, for example. As noted above, the packing material 20 is positioned within the receptacle 10 between an inner surface of the receptacle 10 and at least a portion of the article 40. The amount and size of the packing material 20 is variable and can be dependent on the article 40 inside the receptacle 10. For example, if the article 40 is larger and less fragile, a reduced amount of packing material 20 may be required. However, a small and fragile item will require more packing material 20. In one embodiment, a single piece of packing material 20 is provided in the receptacle 10, while a number of pieces of packing material 20 are provided in the receptacle 10 in another embodiment.

An RFID device 30 is at least partially associated with the packing material 20, with the combination defining an RFID-integrated packing material. The RFID device 30 can be any known type of RFID device, but is preferably configured to be operational after being processed along with the packing material 20 to provide the RFID-integrated packing material with its impact-absorbing configuration.

The RFID device 30 can be an RFID tag, inlay or label having an antenna and an RFID chip coupled to the antenna. The antenna can be formed directly on the packing material 20 or on a substrate attached to the packing material 20. The substrate can be any of a number of applicable materials and can have varying sizes and shapes.

As for the antenna, it can be comprised of conductive ink, a conductive metal, or other antenna types known in the art. The antenna can be a number of shapes and sizes depending on the desired range and frequency. In a particular embodiment shown in FIG. 2A, the RFID device (indicated in general at 101) includes an RFID chip 100 electrically coupled to a dipole antenna 300, with the RFID device 101 being attached to packing material 200. In another exemplary embodiment shown in FIG. 2B, the RFID device (indicated in general at 102) includes an RFID chip 100 electrically coupled to a hybrid slot-loop antenna 310, with the RFID device 102 being attached to packing material 200. Other configurations, such as an RFID device having a reactive strap (as will be described in greater detail herein) may be employed without departing from the scope of the present disclosure.

Figure 2A:
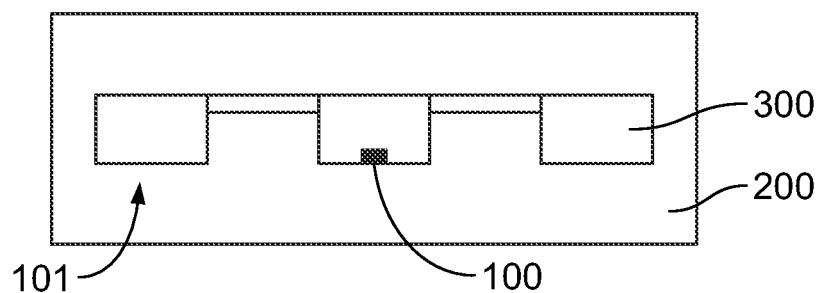
FIG. 2A is an illustrative representation of an RFID device with a dipole type inlay attached to packing material according to an aspect of the current disclosure.
Figure 2B:
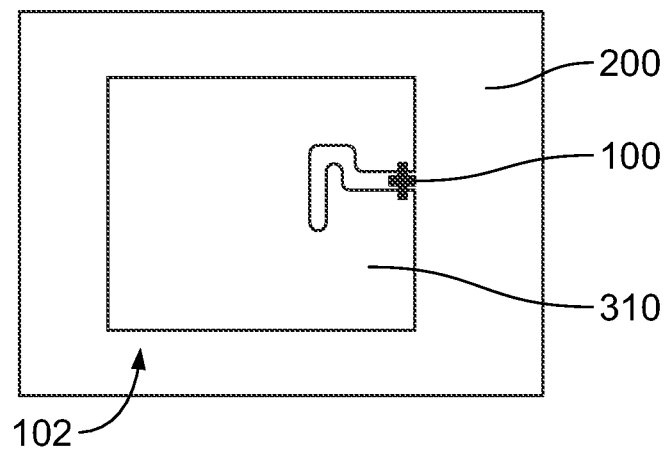
FIG. 2B is an illustrative representation of an RFID device with a hybrid slot-loop antenna attached to packing material according to an aspect of the current disclosure.
Figure 3A:
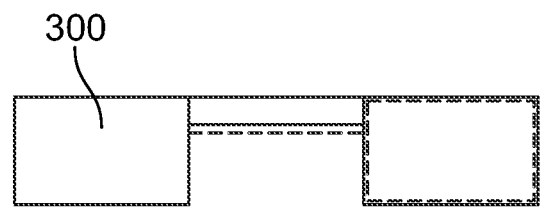
FIG. 3A is an illustrative representation of the RFID device of FIG. 2A, in a folded condition after being processed along with the associated packing material to have an impact-absorbing configuration.
Figure 3B:
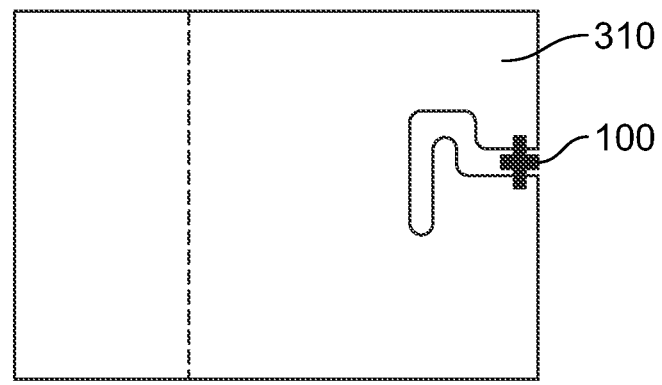
FIG. 3B is an illustrative representation of the RFID device of FIG. 2B, in a folded condition after being processed along with the associated packing material to have an impact-absorbing configuration.

As described above, processing the packing material together with the RFID device to provide an impact-absorbing configuration will affect the configuration of the RFID device and its performance. Some types of RFID devices respond better to certain types of processing, such that it may be advantageous to select the configuration of the RFID device based at least in part on the processing to which the RFID-integrated packing material is to be subjected. For example, if the RFID-integrated packing material is folded, some portion of its RFID device may also be folded, as shown in FIGS. 3A and 3B, in which the dotted lines indicate where an antenna of the RFID device is folded. In FIG. 3A, a portion of the dipole antenna 300 of the RFID device 101 of FIG. 2A is folded onto itself, which brings the dipole antenna arms into close proximity. In FIG. 3B, a portion of the hybrid slot-loop antenna 310 of the RFID device 102 of FIG. 2B is folded onto itself. It should be understood that the antenna of the RFID device on the packing material will be similarly affected when the packing material is crushed or crumpled.

The RFID device 101 with the dipole antenna 300 (FIG. 3A) will exhibit a decrease in performance when the two arms come in close proximity. The RFID device 102 with the hybrid slot-loop antenna 310 (FIG. 3B) will also exhibit a decrease in performance, but it is more controlled and less susceptible to dramatic decreases in performance. In the case of the hybrid slot-loop antenna 310, the folding brings a blank unstructured area of conductor into proximity with another as part of the antenna structure. The reduction of effective area/length will reduce performance in a controlled way, but good performance is retained for greater proportional amounts of folding than a dipole antenna 300. Accordingly, in the case of an RFID-integrated packing material to be processed by folding, an RFID device having a hybrid slot-loop antenna (as in FIGS. 2B and 3B) may be preferred to an RFID device having a dipole antenna (as in FIGS. 2A and 3A).

Figure 4:
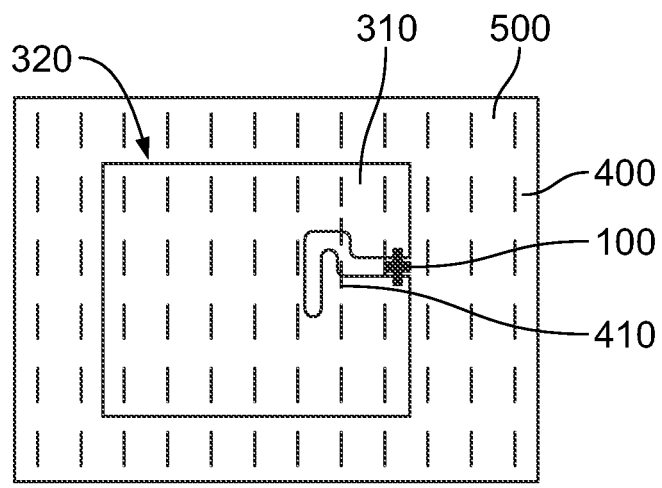
FIG. 4 is an illustrative representation of the RFID device and packing material of FIG. 2B, in a slit or cut condition after being processed to have an impact-absorbing configuration.

FIG. 4 shows the RFID device 102 of FIG. 2B after it and the associated packing material having been processed to define a plurality of cuts or slits or rips or tears in the RFID device (identified in FIG. 4 as 320) and packing material (identified in FIG. 4 as 500). The processed packing material 500 is cut at slits 400 and 410 to allow it to be pushed into a 3D surface, making it capable of providing greater packing effectiveness by locking the cut sections together. Slits 410 pass through the RFID device 320 and may cut the antenna 310 of the RFID device 320. The illustrated hybrid slot-loop antenna 310, due to the larger area of its conductor, with small areas of critical function (namely, the slot and RFID chip 100), may be more resistant to the slitting operation than other types of antennas.

Figure 5:
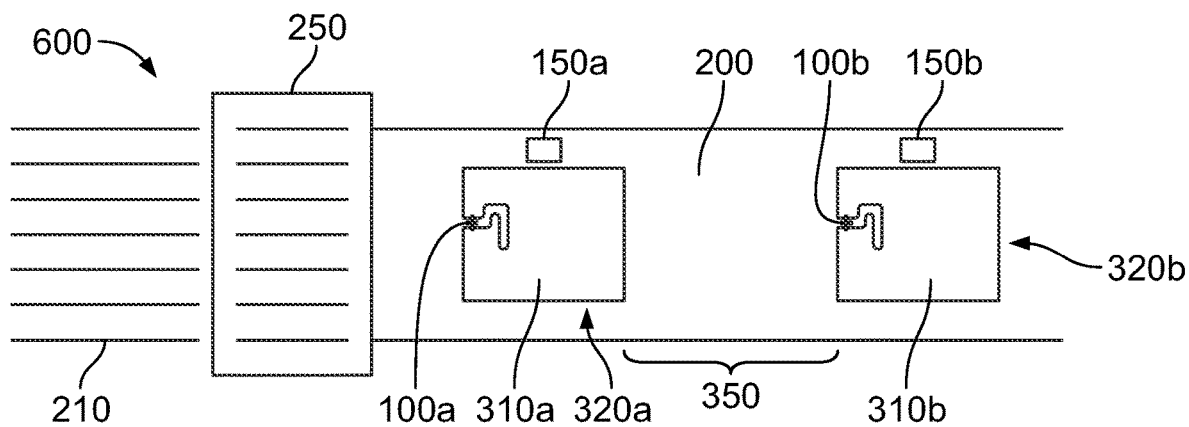
FIG. 5 is an illustrative representation of an exemplary system for cutting or slitting the RFID device and packing material of FIG. 2B to have the impact-absorbing configuration of FIG. 4.

FIG. 5 illustrates an exemplary embodiment of a cutting or slitting system or machine, indicated in general at 600, that can be utilized according to the current disclosure. The slitting operation may be synchronized to the presence of an RFID device or devices. In the embodiment of FIG. 5, the packing material 200 is provided in an elongated web that is conveyed to the slitting apparatus 250 and produces slit packing material 210. Upstream of the slitting apparatus 250, RFID devices may be associated to the packing material according to any suitable approach. This may include (for example) printing conductive material onto the packing material in the shape of an antenna; applying conductive material onto the packing material and then removing a portion of the conductive material, with the remaining conductive material defining an antenna; or securing a substrate associated with an assembled RFID device to the packing material.

RFID devices 320a and 320b can be placed strategically on the web of packing material 200 so that only the non-critical portions of the RFID devices (e.g., the antennas 310a and 310b) and not the critical portions (e.g., the RFID chips 100a and 100b) will be slit in slitting apparatus 250.

The number and size of the RFID devices can be selected based on the nature and configuration of the associated article 40 and/or container 10. The RFID devices may be positioned on the web a specific distance or pitch 350 apart, which may be based on the size and/or configuration of the receptacle 10 into which the RFID-integrated packing material is to be inserted. Typically, it is sufficient for a single RFID device to be incorporated into an RFID-integrated package, such that the pitch 350 may be selected to correspond generally to the total amount of RFID-integrated packing material to be placed into a single receptacle 10.

The system 600 may also or alternatively utilize markers 150a and 150b to adjust operation when an RFID device is passing through the machine and include a sensor to read the marker when it is approaching or within a certain range. Markers 150a and 150b can be any type of suitable marker or indicator. For example, the markers may be optical markers or metal markers. The associated sensor can be any associated reader for the specific marker (e.g., a metal detector).

Figure 6:
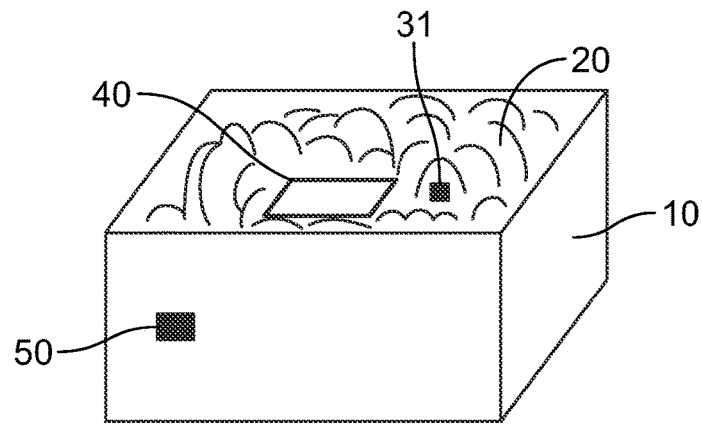
FIG. 6 is an illustrative representation of an exemplary RFID-integrated package of the current disclosure, with the RFID device only partially associated to the packing material.
Figure 7:
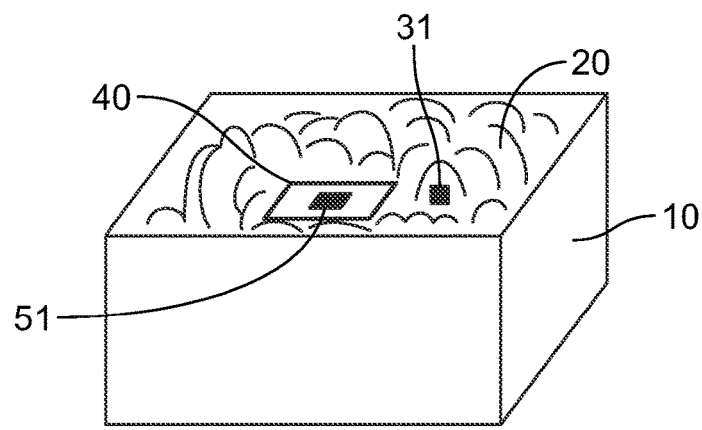
FIG. 7 is an illustrative representation of another exemplary RFID-integrated package of the current disclosure, with the RFID device only partially associated to the packing material.

In the case of many RFID devices, it will be most appropriate for the entire RFID device to be associated to the packing material. However, it is within the scope of the present disclosure for an RFID device to be only partially associated to the packing material, such as with only an antenna of the RFID device associated to the packing material and other components of the RFID positioned elsewhere. For example, FIGS. 6 and 7 show how an RFID device comprising a reusable reactive strap and an antenna, e.g. a dipole antenna or a hybrid slot-loop antenna may be utilized with an RFID-integrated package of the current disclosure. In one embodiment, the antenna while still being coupled to the reactive strap is independently associated to the packing material as compared to the reactive strap, which is associated to either the receptacle or the article. In FIG. 6, reactive strap 50 is attached to a surface of receptacle 10, while the antenna 31 coupled to the reactive strap 50 is associated to the packing material 20 (e.g., in the form of a conductor applied in a continuous stripe along at least a portion of the length of the unprocessed packing material). In FIG. 7 reactive strap 51 is attached to the article 40, while the associated antenna 31 is attached to the packing material 20. A reactive strap may also be attached to the packing material 20, either to the same piece of packing material as the associated antenna or to a different piece of packing material.

When placed in proximity, the reactive strap stimulates an antenna response into any adjacent conductor, providing a far field read rather than a near field read of the strap itself. Having the strap pre-attached to the article 40 as a way of identifying the package may be particularly advantageous, as the packing material (having antenna that may be paired to the reactive strap) gives the RFID-integrated package enhanced RFID response in transit for logistics, but reduced performance when long range is not required to identify the article 40 in a retail location. A reactive strap is relatively small, so it may be advantageous for attaching to small articles and containers.

The RFID-integrated package of the current disclosure may be used in conjunction with a single or multiple RFID readers to provide any of a number of functions. In addition to allowing for the package and associated article to be tracked and identified, RFID readers emitting RF signals can be used to sense or read the RFID device of an RFID-integrated packing material to assess whether sufficient packing material has been inserted into the receptacle.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An RFID-integrated package, comprising:
    a receptacle comprising an inner surface;
    an article positioned within the receptacle; and
    a packing material positioned within the receptacle between at least a portion of the article and the inner surface of the receptacle and having an impact-absorbing configuration, wherein the packing material comprises:
    an impact-absorbing material, and
    an RFID device comprising a reactive strap and an antenna, wherein the RFID device is at least partially associated to the impact-absorbing material.

2. The RFID-integrated package of claim 1, wherein the antenna is independently associated to the packing material as compared to the reactive strap.

3. The RFID-integrated package of claim 1, wherein the antenna is a slot-loop hybrid antenna electrically coupled to a RFID chip of the RFID device.

4. The RFID-integrated package of claim 1, wherein the RFID device comprises an RFID chip; and wherein the antenna is a dipole antenna electrically coupled to the RFID chip.

5. The RFID-integrated package of claim 2, wherein:
    the antenna is associated to the packing material; and
    the reactive strap is associated to the receptacle or to the article.

6. The RFID-integrated package of claim 2, wherein:
    the antenna is associated to the packing material; and
    the reactive strap is associated to either a same piece of packing material as the antenna or to a different piece of packing material from the antenna.

7. The RFID-integrated package of claim 1, wherein the packing material and at least a portion of the RFID device are folded.

8. The RFID-integrated package of claim 1, wherein the packing material and at least a portion of the RFID device are crushed.

9. The RFID-integrated package of claim 1, wherein the packing material and at least a portion of the RFID device are cut or slit.

10. A method of integrating an RFID device into a package, comprising:
    at least partially associating an RFID device comprising a reactive strap and an antenna to a packing material to define an RFID-integrated packing material;
    processing the RFID-integrated packing material to provide an impact-absorbing configuration; and
    inserting the RFID-integrated packing material into a receptacle between an inner surface of the receptacle and at least a portion of an article positioned within the receptacle.

11. The method of claim 10, wherein said at least partially associating the RFID device to the packing material to define the RFID-integrated packing material comprises:

providing the packing material in an elongated web, at least partially associating a plurality of RFID devices to the elongated web, and processing the elongated web between adjacent RFID devices to define individual pieces of RFID-integrated packing material, with each piece of RFID-integrated packing material having a length based at least in part on the size and/or configuration of the receptacle into which the piece of RFID-integrated packing material is to be inserted, and being configured such that a single piece of RFID-integrated packing material is inserted into each receptacle.

12. The method of claim 10, further comprising:

communicating with the RFID-integrated packing material via an RF signal, and determining whether sufficient packing material has been inserted into the receptacle based at least in part on said communication with the RFID-integrated packing material.

13. The method of claim 10, wherein said at least partially associating the RFID device to the packing material to define the RFID-integrated packing material comprises:

associating a conductive material to the packing material, and removing a portion of the conductive material to define an antenna of the RFID device.

14. The method of claim 10, wherein said at least partially associating the RFID device to the packing material to define the RFID-integrated packing material comprises printing a conductive material onto the packing material to define an antenna of the RFID device.

15. The method of claim 10, wherein said processing the RFID-integrated packing material to provide the impact-absorbing configuration comprises folding the packing material and at least a portion of the RFID device.

16. The method of claim 10, wherein said processing the packing material to provide the impact-absorbing configuration comprises crushing the packing material and at least a portion of the RFID device.

17. The method of claim 10, wherein said processing the RFID-integrated packing material to provide the impact-absorbing configuration comprises cutting or slitting the packing material and at least a portion of the RFID device.

18. The method of claim 10, wherein said at least partially associating the RFID device to the packing material to define the RFID-integrated packing material comprises associating only an antenna of the RFID device to the packing material and associating the reactive strap to the receptacle or the article.

* * * * *